United States Patent
Nakano et al.

(10) Patent No.: US 9,973,666 B2
(45) Date of Patent: May 15, 2018

(54) CAMERA MODULE AND ELECTRONIC APPARATUS INCLUDING CONDUCTIVE HOUSING AND FEEDING COIL

(71) Applicant: Murata Manufacturing Co., Ltd., Nagaokakyo-shi, Kyoto-fu (JP)

(72) Inventors: Shinichi Nakano, Nagaokakyo (JP); Satoshi Ishino, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 43 days.

(21) Appl. No.: 15/068,779

(22) Filed: Mar. 14, 2016

(65) Prior Publication Data

US 2016/0198070 A1    Jul. 7, 2016

Related U.S. Application Data

(63) Continuation of application No. PCT/JP2014/073446, filed on Sep. 5, 2014.

(30) Foreign Application Priority Data

Sep. 17, 2013    (JP) .................................. 2013-191903

(51) Int. Cl.
*H04N 5/225* (2006.01)
*H01F 38/14* (2006.01)
*H01F 27/28* (2006.01)

(52) U.S. Cl.
CPC ....... *H04N 5/2252* (2013.01); *H01F 27/2804* (2013.01); *H01F 38/14* (2013.01); *H04N 5/2254* (2013.01); *H04N 5/2257* (2013.01)

(58) Field of Classification Search
CPC .. H04N 5/2252; H04N 5/2253; H04N 5/2254; H04N 5/2257; H01F 27/2804; H01F 38/14
(Continued)

(56) References Cited

U.S. PATENT DOCUMENTS

| 8,976,075 B2 * | 3/2015 | Kato ........................ H01Q 1/38 343/788 |
| 2006/0197865 A1 * | 9/2006 | Birecki ................ H04N 5/2253 348/345 |

(Continued)

FOREIGN PATENT DOCUMENTS

| CN | 102956974 A | 3/2013 |
| JP | 4993045 B2 | 8/2012 |

(Continued)

OTHER PUBLICATIONS

Official Communication issued in International Patent Application No. PCT/JP2014/073446, dated Dec. 16, 2014.

*Primary Examiner* — Pritham Prabhakher
(74) *Attorney, Agent, or Firm* — Keating & Bennett, LLP

(57) ABSTRACT

A camera module includes a lens and an image sensor that converts an image formed by the lens into an electrical signal. The camera module is disposed such that the lens is exposed from an opening in a metal housing. A feeding coil to which a feeding circuit is directly or indirectly connected, is disposed, for example, in a space between the image sensor and the lens in a direction of an optical axis of the lens. The feeding coil is coupled to the metal housing by a magnetic field, so that the metal housing defines and functions as a radiating element for communication.

9 Claims, 8 Drawing Sheets

(58) Field of Classification Search
USPC .......................................................... 348/374
See application file for complete search history.

(56) References Cited

U.S. PATENT DOCUMENTS

| | | | | |
|---|---|---|---|---|
| 2007/0216799 A1* | 9/2007 | Honma | ................ | G02B 7/105 348/374 |
| 2008/0285163 A1* | 11/2008 | Kasuga | ................ | G02B 7/021 359/823 |
| 2010/0065638 A1 | 3/2010 | Kim | | |
| 2011/0044679 A1* | 2/2011 | Yoshida | ................ | G02B 7/08 396/133 |
| 2011/0090580 A1* | 4/2011 | Shiraki | ................ | G02B 7/022 359/824 |
| 2011/0299181 A1* | 12/2011 | Pang | ................ | G02B 7/022 359/824 |
| 2012/0026611 A1* | 2/2012 | Hu | ................ | G02B 7/08 359/824 |
| 2012/0091821 A1 | 4/2012 | Kato et al. | | |
| 2013/0026858 A1* | 1/2013 | Chiang | ................ | H02K 41/0356 310/12.16 |
| 2013/0107382 A1* | 5/2013 | Chou | ................ | H02K 41/0356 359/824 |
| 2013/0176634 A1* | 7/2013 | Dinesen | ................ | G03B 3/10 359/814 |
| 2013/0207852 A1 | 8/2013 | Nakano | | |
| 2013/0287383 A1* | 10/2013 | Haruguchi | ................ | G03B 3/10 396/133 |
| 2013/0328407 A1* | 12/2013 | Shimura | ................ | H02J 7/025 307/104 |
| 2014/0063326 A1* | 3/2014 | Tanabe | ................ | H04N 5/2257 348/345 |
| 2014/0198006 A1 | 7/2014 | Nakano | | |
| 2015/0195459 A1* | 7/2015 | Yeo | ................ | G03B 5/00 348/208.2 |
| 2016/0025995 A1* | 1/2016 | Ariji | ................ | G02B 7/08 359/557 |

FOREIGN PATENT DOCUMENTS

| | | |
|---|---|---|
| JP | 2013-055637 A | 3/2013 |
| WO | 2013/115017 A1 | 8/2013 |

* cited by examiner

CAMERA MODULE AND ELECTRONIC APPARATUS INCLUDING CONDUCTIVE HOUSING AND FEEDING COIL

BACKGROUND OF THE INVENTION

1. Field of the Invention

The present invention relates to a camera module included in, for example, a portable electronic apparatus, and also relates to an electronic apparatus including the camera module.

2. Description of the Related Art

An HF band communication system, such as near field communication (NFC), has been implemented in portable electronic apparatuses, such as cellular phone terminals and tablet terminals.

As the portable electronic apparatuses become thinner and more diverse in design, an increasing number of such apparatuses include a housing (metal housing) with a metal plate, which is made of a material such as a magnesium or aluminum plate.

However, in an electronic apparatus including a metal housing, an HF band antenna coil is shielded by the metal housing. This makes it unable to communicate with a communication partner, or causes a considerable reduction in communication distance.

There is a known technique in which an opening and a slit are formed in a metal housing and a feeding coil is placed to overlap the opening, so that the metal housing is used as a radiating element for communication (e.g., Japanese Patent No. 4993045). As described in Japanese Patent No. 4993045, the opening in the metal housing can be used as a camera lens hole.

When the opening is used as a camera lens hole, a camera module is disposed in the center of the feeding coil. This means that a magnetic field distribution near the feeding coil is influenced by the positional relation between the feeding coil and the camera module. If the relative position of the feeding coil and the camera module varies, the magnetic field distribution near the feeding coil varies, and the coupling state between the feeding coil and the metal housing used as a radiating element also varies. As a result, desired communication characteristics may not be achieved. In particular, since the positions of the camera module, the feeding coil, and the opening in the metal housing (i.e., three points) need to be aligned, it is difficult to improve accuracy in the relative position of the camera module and the feeding coil.

SUMMARY OF THE INVENTION

Preferred embodiments of the present invention solve the problems associated with misalignment between the feeding coil and the camera module, thus providing a camera module and an electronic apparatus that achieve stable communication characteristics using a feeding coil.

A camera module according to a preferred embodiment of the present invention includes a lens and an image sensor that converts an image formed by the lens into an electrical signal. The camera module is disposed such that the lens is exposed from an opening located in a conductive housing of an electronic apparatus. The camera module includes a feeding coil to which a feeding circuit is directly or indirectly connected.

In the structure described above, the feeding coil is included in (integrated into) the camera module. Hence, it is less likely that problems associated with misalignment of the feeding coil and the camera module will occur, and it is possible to achieve stable communication characteristics.

The feeding coil is preferably disposed in a space between the image sensor and the lens in a direction of an optical axis of the lens. With this structure, the space between the lens and the image sensor is effectively used, and the feeding coil is able to be made smaller than that in the case where the feeding coil is disposed by avoiding the camera module. Additionally, the feeding coil is able to be brought closer to the opening in the conductive housing, and hence it is possible to enhance the electromagnetic field coupling between the feeding coil and the housing.

It is preferable, for example, that a lens holder be provided with the feeding coil wound about the optical axis of the lens. According to this structure, a feeding coil with many turns is able to be included in the camera module without any increase in size.

For example, a substrate is provided with the feeding coil wound about the optical axis of the lens. This structure facilitates formation and assembly of the feeding coil.

For example, the feeding coil preferably is a chip component including a conductive winding pattern, and is disposed on the substrate. This structure allows use of a feeding coil produced in a different process.

A camera module according to a preferred embodiment of the present invention preferably includes a cable including a plurality of signal lines. A first end of the cable is connected to a circuit on a side of the image sensor or the substrate, and a second end of the cable opposite the first end is connected to a circuit on a side of the electronic apparatus. The feeding coil is preferably connected to at least one of the plurality of signal lines of the cable. With this structure, there is no need to provide an additional cable for the feeding coil, and hence the number of components is able to be reduced.

An electronic apparatus according to a preferred embodiment of the present invention includes a conductive housing including an opening, and a camera module including a lens and an image sensor that converts an image formed by the lens into an electrical signal. In the electronic apparatus, the camera module is disposed such that the lens is exposed from the opening. The camera module includes a feeding coil to which a feeding circuit is directly or indirectly connected. Electromagnetic field coupling between the housing and the feeding coil allows the housing to define and function as a radiating element for wireless communication.

With this structure, the housing of the electronic apparatus is able to be used as a radiating element for wireless communication, and stable communication characteristics are able to be achieved.

The camera module preferably further includes a lens holder that holds the lens. It is preferable that the lens holder be provided with the feeding coil wound about an optical axis of the lens, and that the feeding coil be disposed in a region extending from an inside to an outside of the housing. This structure significantly reduces or prevents variation in characteristics caused by variation in the position of the camera module with respect to the housing.

For example, a circuit board in the housing of the electronic apparatus may be provided with a coupling coil coupled to the feeding coil by a magnetic field. With this structure, the cable that connects the camera module to the circuit on the side of the electronic apparatus main body does not need to include a signal line for wireless communication.

Various preferred embodiments of the present invention solve problems associated with misalignment between the feeding coil and the camera module, thus providing a camera module and an electronic apparatus having stable communication characteristics.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
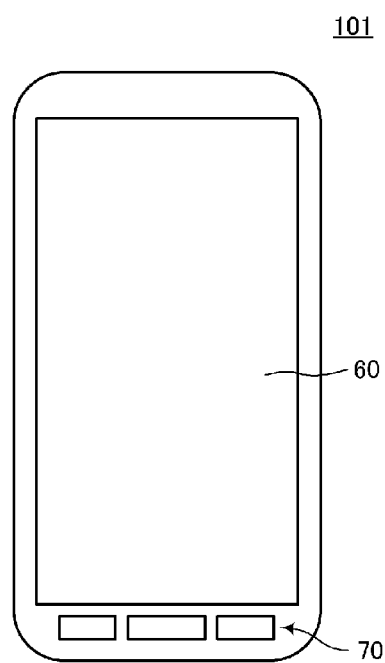
FIG. 1A is a top (front) view of an electronic apparatus 101 including a camera module according to a first preferred embodiment of the present invention.

With reference to the drawings, a plurality of preferred embodiments for carrying out the present invention will be described using some concrete examples. In the drawings, the same elements are denoted by the same reference numerals. The preferred embodiments described herein are merely examples, and it should be clear that some components, elements, features, characteristics, etc. described in one preferred embodiment may be replaced or combined with those in another preferred embodiment.

First Preferred Embodiment

Figure 1B:
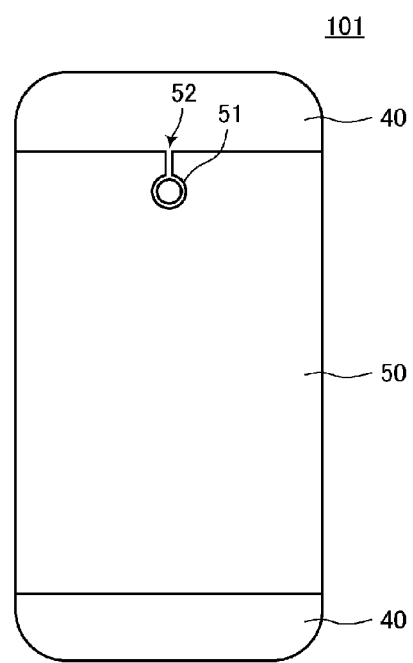
FIG. 1B is a bottom (back) view of the electronic apparatus 101.

FIG. 1A is a top (front) view of an electronic apparatus 101 including a camera module according to a first preferred embodiment of the present invention, and FIG. 1B is a bottom (back) view of the electronic apparatus 101. The electronic apparatus 101 is, for example, a cellular phone terminal or a tablet terminal, and includes a circuit for NFC-based communication.

As illustrated in FIG. 1A, the electronic apparatus 101 includes, on the front side thereof, a display 60, which combines a touch panel with a display panel, and operation buttons 70. As illustrated in FIG. 1B, the electronic apparatus 101 includes a resin housing 40 and a metal housing 50 with conductivity. The metal housing 50 includes an opening 51 and a slit 52. A camera module is disposed in the housing of the electronic apparatus 101, with a lens facing the opening 51. A lens 1 of the camera module is disposed to be exposed from the opening 51. The slit 52 may have a width equal to the diameter of the opening 51.

Figure 2A:
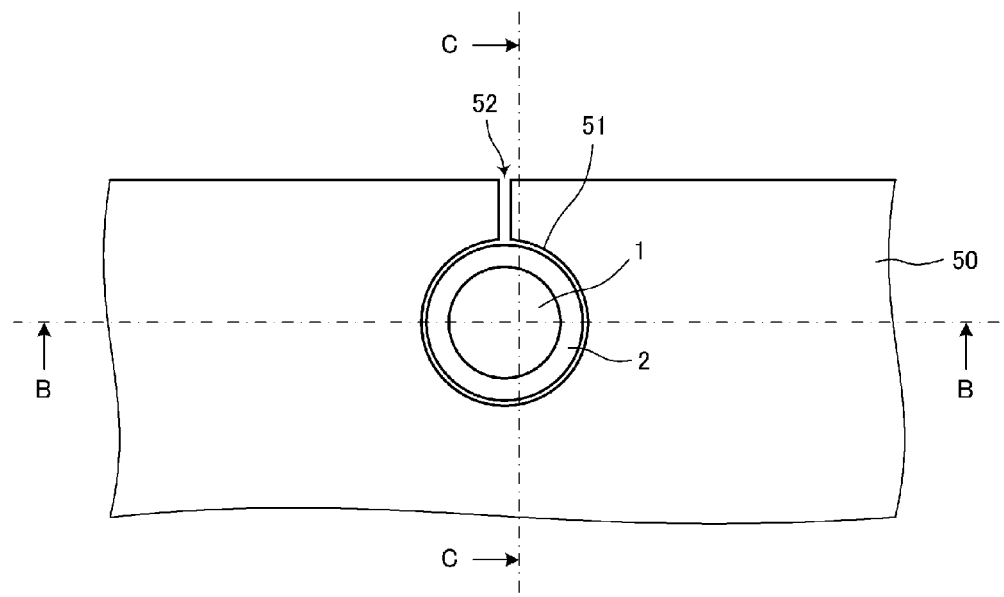
FIG. 2A is a plan view illustrating a structure of an area including an opening 51 located in a metal housing.
Figure 2B:
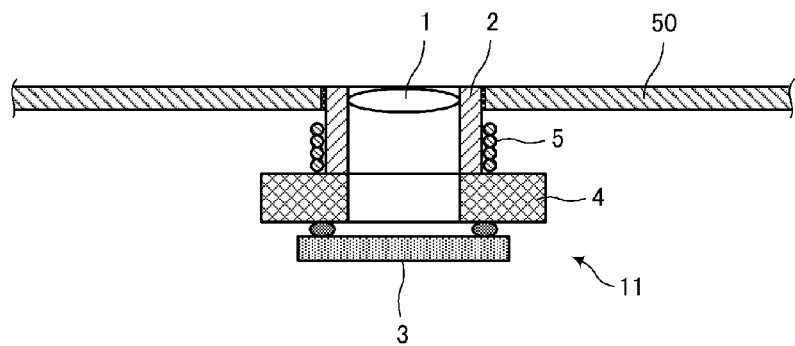
FIG. 2B is a cross-sectional view taken along line B-B of FIG. 2A.

FIG. 2A is a plan view illustrating a structure of an area including the opening 51 formed in the metal housing. FIG. 2B is a cross-sectional view taken along line B-B of FIG. 2A. A camera module 11 includes the lens 1, a lens holder 2 that holds the lens 1, an image sensor 3 that converts an image formed by the lens 1 into an electrical signal, and a substrate 4. The lens 1 and the image sensor 3 are disposed to face each other, with a predetermined distance therebetween.

The substrate 4 has a hole which allows light from the lens 1 to pass therethrough. The image sensor 3 is connected face-down to the substrate 4, with solder bumps interposed therebetween. The substrate 4 is disposed between the lens holder 2 and the image sensor 3, and attached to the lower portion of the lens holder 2.

The lens holder 2 is provided with a feeding coil 5 wound about the optical axis of the lens 1. That is, the feeding coil 5 is wound around the outer periphery of the lens holder 2 having a cylindrical shape. The feeding coil 5 is wound in multiple turns (multilayer winding). The feeding coil 5 is disposed between the lens 1 and the image sensor 3 in the direction of the optical axis. Also, the feeding coil 5 is disposed in the space between the metal housing 50 and the substrate 4. The camera module 11 is held in place, with an end portion of the lens holder 2 inserted in the opening 51 in the metal housing 50. For example, the outer periphery of the end portion of the lens holder 2 is bonded to the inner periphery of the opening 51. Alternatively, the camera module 11 is attached to a circuit board (not shown) in the housing or to the resin housing, and is designed to be brought into the state of FIGS. 2A and 2B when the metal housing 50 is mounted onto the resin housing 40.

Figure 3:
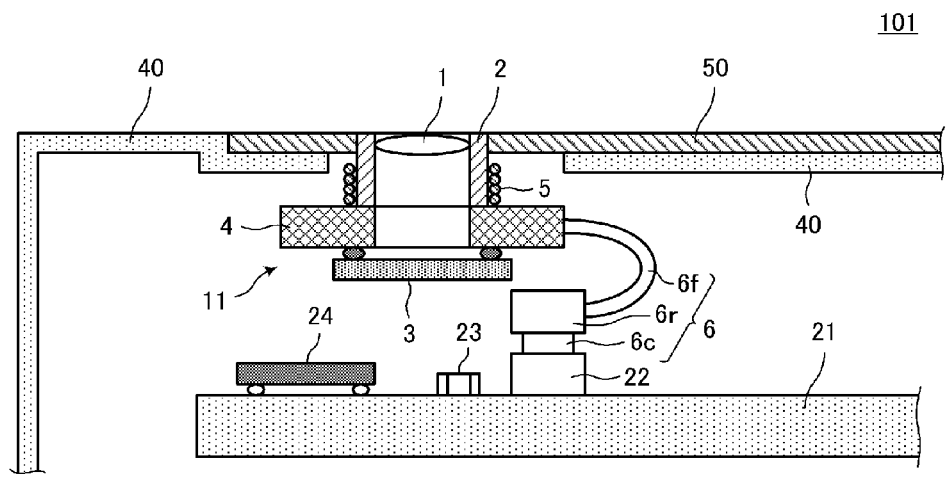
FIG. 3 is a cross-sectional view taken along line C-C of FIG. 2A.
Figure 4:
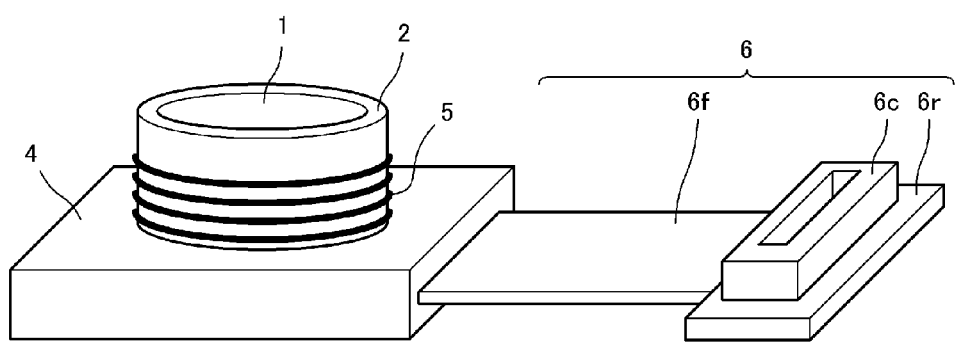
FIG. 4 is a perspective view of a camera module 11.

FIG. 3 is a cross-sectional view taken along line C-C of FIG. 2A. FIG. 4 is a perspective view of the camera module 11. As illustrated in these drawings, a cable 6 is extended from the substrate 4 of the camera module 11. The cable 6 includes a flexible portion 6f, a rigid portion 6r, and a receptacle 6c. A circuit board 21 in the electronic apparatus 101 is provided with a plug 22, a chip capacitor 23, and an RFIC 24.

A first end of the cable 6 is connected to a circuit on the side of the image sensor 3 or the substrate 4, and a second end (receptacle 6c) of the cable 6 opposite the first end is connected to a circuit on the side of the circuit board 21. The cable 6 includes a plurality of signal lines, and the feeding coil 5 is connected to at least one of the plurality of signal lines of the cable 6. Accordingly, as illustrated in FIG. 3, by simply attaching the receptacle 6c at the end of the cable of the camera module 11 to the plug 22 on the circuit board 21, the connection of the camera module and the connection of the feeding coil 5 are made at the same time.

Figure 5:
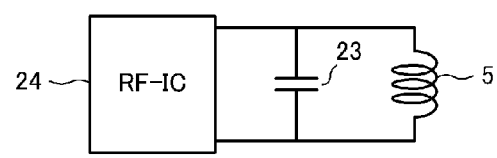
FIG. 5 is a circuit diagram of a high-frequency circuit including a feeding coil 5.

FIG. 5 is a circuit diagram of a high-frequency circuit including the feeding coil 5. The capacitor 23 is connected in parallel to the feeding coil 5 to define a resonance circuit, and this parallel circuit is connected to the RFIC 24. That is, the feeding coil 5 is directly connected by the cable 6 to the RFIC 24. The RFIC 24 corresponds to a "feeding circuit". The inductance of the feeding coil 5 and the capacitance of the capacitor 23 are determined such that the resonance circuit resonates in the communication frequency band.

As illustrated in FIGS. 2A to 4, winding the feeding coil 5 around the lens holder 2 allows the lens holder 2 to be used as a core member, and reduces misalignment of the feeding coil 5 in the camera module 11. Also, the camera module is prevented from increasing in size when a feeding coil with many turns is provided. It is thus possible to provide a compact antenna-mounted camera module having stable communication characteristics.

Figure 6A:
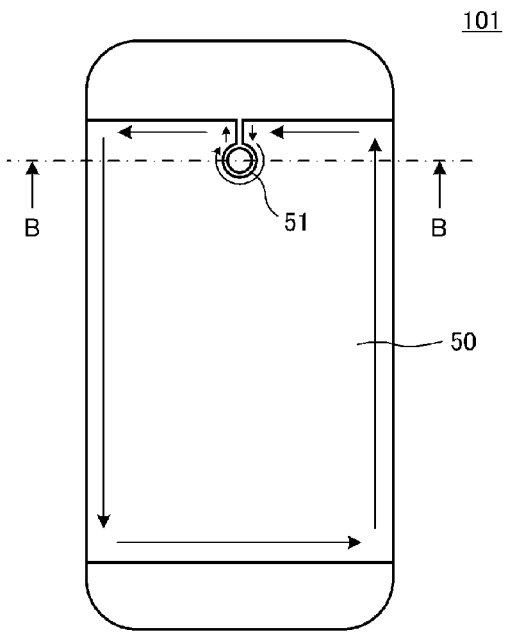
FIG. 6A is a bottom (back) view of the electronic apparatus 101.
Figure 6B:
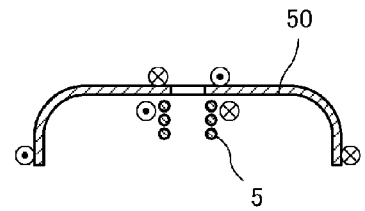
FIG. 6B is a cross-sectional view taken along line B-B of FIG. 6A, and particularly illustrating the metal housing 50 and the feeding coil 5.

FIG. 6A is a bottom (back) view of the electronic apparatus 101. FIG. 6B is a cross-sectional view taken along line B-B of FIG. 6A, and particularly illustrating the metal housing 50 and the feeding coil 5. As indicated by dot marks and cross marks in FIG. 6B, when a current flows in the feeding coil 5, a current is induced, by an electromagnetic field (mainly a magnetic field), around the opening 51 in the metal housing 50. As illustrated in FIG. 6A, this current flows along the outer edge of the metal housing 50. The metal housing 50 is thus coupled by a magnetic field to a communication partner, such as a loop antenna, so that communication in the HF band is performed. When a magnetic field is applied to the metal housing 50, a current flows along the outer edge of the metal housing 50 and around the opening 51. The current flowing around the opening 51 allows a current to be induced, by an electromagnetic field (mainly a magnetic field), in the feeding coil.

As described above, the metal housing 50 is coupled to the feeding coil 5 by an electromagnetic field (mainly a magnetic field), and defines and functions as a radiating element for wireless communication in the HF band.

Second Preferred Embodiment

Figure 7:
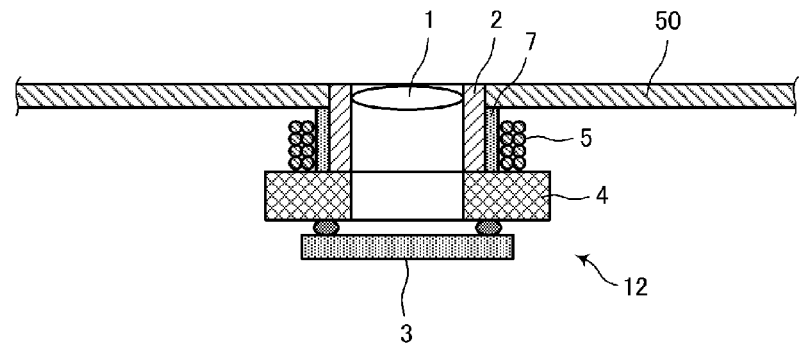
FIG. 7 is a cross-sectional view illustrating a structure of a camera module according to a second preferred embodiment of the present invention, together with a portion of the metal housing.

FIG. 7 is a cross-sectional view illustrating a structure of a camera module according to a second preferred embodiment of the present invention, together with a portion of the metal housing. A camera module 12 includes the lens 1, the lens holder 2 that holds the lens 1, the image sensor 3 that converts an image formed by the lens 1 into an electrical signal, and the substrate 4. The lens holder 2 is provided with the feeding coil 5 wound about the optical axis of the lens 1. The lens holder 2 is further provided with a magnetic member 7 on the inner periphery of the feeding coil 5 (i.e., between the lens holder 2 and the feeding coil 5). That is, the magnetic member 7 is disposed along the outer periphery of the lens holder 2 having a cylindrical shape, and the feeding coil 5 is wound along the outer periphery of the magnetic member 7. The feeding coil 5 and the magnetic member 7 are disposed in the space between the metal housing 50 and the substrate 4. The magnetic member 7 is produced preferably by forming a resin material mixed with a ferrite filler into a cylindrical shape, or is a sintered ferrite material molded into a cylindrical shape. In the present preferred embodiment, the lens holder 2 and the substrate 4 are treated as a coil bobbin, and the feeding coil is wound in multiple layers.

With the magnetic member 7 on the inner periphery of the feeding coil 5, it is possible to increase the inductance of the feeding coil 5, and to reduce the size of a feeding coil portion having a desired inductance.

Third Preferred Embodiment

Figure 8:
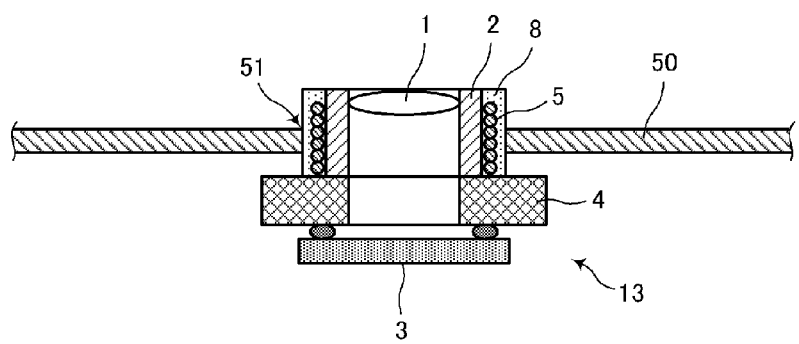
FIG. 8 is a cross-sectional view illustrating a structure of a camera module according to a third preferred embodiment of the present invention, together with a portion of the metal housing.

FIG. 8 is a cross-sectional view illustrating a structure of a camera module according to a third preferred embodiment of the present invention, together with a portion of the metal housing. A camera module 13 includes the lens 1, the lens holder 2, the image sensor 3, and the substrate 4. The lens holder 2 is provided with the feeding coil 5 therearound. The feeding coil 5 is wound about the optical axis of the lens 1. The feeding coil 5 is coated with a cover layer 8 having a low dielectric constant.

The camera module 13 is held in place, with an end portion of the lens holder 2 inserted in the opening 51 in the metal housing 50. For example, the cover layer 8 is bonded to the inner periphery of the opening 51. Alternatively, the camera module 13 is attached to the circuit board (not shown) in the housing or to the resin housing, and is designed to be brought into the state of FIG. 8 when the metal housing 50 is mounted onto the resin housing 40.

The feeding coil 5 is disposed such that its winding width extends from the inside to the outside of the metal housing 50. That is, the feeding coil 5 is wound around the lens holder 2 over a region extending on both the outside and inside of the metal housing 50. Therefore, even when there is variation in the amount of protrusion of the lens holder 2 from the opening 51 in the metal housing 50, the distance between opposite portions of the feeding coil 5 and the metal housing 50 and the area where the feeding coil 5 and the metal housing 50 face each other do not vary significantly, and hence a stray capacitance generated between the feeding coil 5 and the metal housing 50 does not vary significantly. Accordingly, there is less variation in the electrical characteristics of the feeding coil 5 associated with the variation described above.

Since the feeding coil 5 is coated with the cover layer 8 having a low dielectric constant, a stray capacitance generated between the feeding coil 5 and the metal housing 50 is significantly reduced.

Fourth Preferred Embodiment

Figure 9:
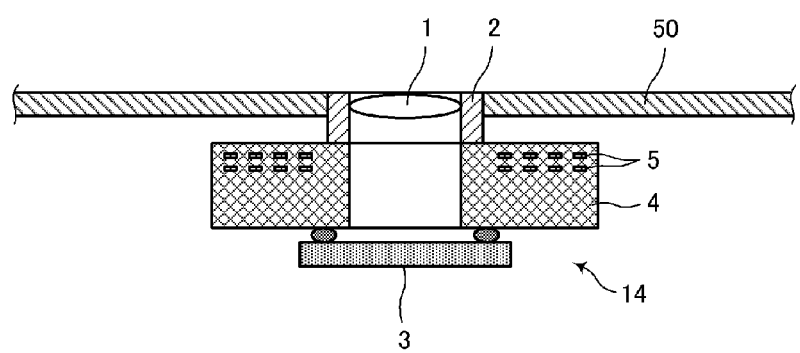
FIG. 9 is a cross-sectional view illustrating a structure of a camera module according to a fourth preferred embodiment of the present invention, together with a portion of the metal housing.

FIG. 9 is a cross-sectional view illustrating a structure of a camera module according to a fourth preferred embodiment of the present invention, together with a portion of the metal housing. A camera module 14 includes the lens 1, the lens holder 2, the image sensor 3, and the substrate 4. In the substrate 4, the feeding coil 5 winds about the optical axis of the lens 1.

The substrate 4 is a resin multilayer substrate, in which the feeding coil 5 is defined by a conductive winding pattern. The feeding coil 5 is wound in multiple turns and multiple layers. In the direction of thickness of the substrate 4, the feeding coil 5 is disposed on a side closer to the lens 1. Since this brings the feeding coil 5 and the metal housing 50 closer to each other, a current flowing in the feeding coil 5 allows a current to be more easily induced in the metal housing 50.

When the substrate 4 of the camera module 14 is provided with the feeding coil 5 as described above, forming the substrate 4 allows the feeding coil 5 to be incorporated into the camera module 14, thus facilitating the manufacture. Also, the number of components is able to be reduced, and hence cost reduction is achieved.

Fifth Preferred Embodiment

Figure 10:
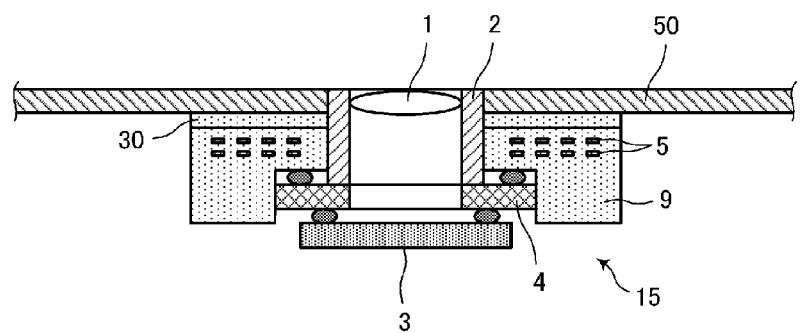
FIG. 10 is a cross-sectional view illustrating a structure of a camera module according to a fifth preferred embodiment of the present invention, together with a portion of the metal housing.

FIG. 10 is a cross-sectional view illustrating a structure of a camera module according to a fifth preferred embodiment of the present invention, together with a portion of the metal housing. A camera module 15 includes the lens 1, the lens holder 2, the image sensor 3, the substrate 4, and a flexible multilayer substrate 9. In the flexible multilayer substrate 9, the feeding coil 5 is wound about the optical axis of the lens 1. The flexible multilayer substrate 9 and the inner surface of the metal housing 50 are bonded to each other, with a bonding member 30 interposed therebetween. Since the flexible multilayer substrate 9 is flexible (has flexibility), the flexible multilayer substrate 9 and the metal housing 50 are able to be bonded together even when the inner surface of the metal housing 50 bends or has some degree of unevenness.

Figure 11A:
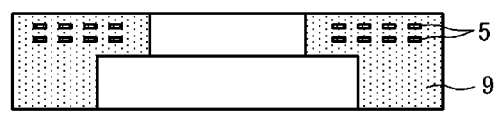
FIG. 11A is a cross-sectional view of each portion of a camera module 15 before assembly.
Figure 11A:
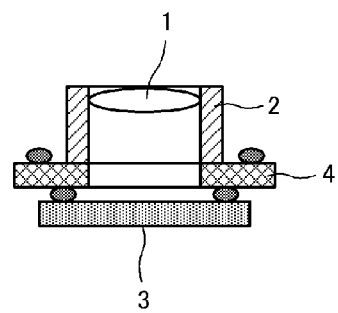
Figure 11B:
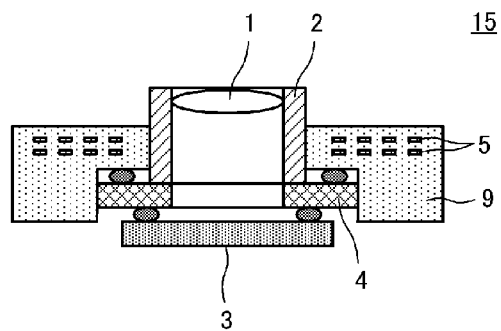
FIG. 11B is a cross-sectional view after assembly.

FIG. 11A is a cross-sectional view of each portion of the camera module 15 before assembly, and FIG. 11B is a cross-sectional view after assembly. In the assembly of the camera module 15, as illustrated in FIG. 11A, the lens holder 2 holding the lens 1 is first joined to the front surface of the substrate 4, and the image sensor 3 is joined to the back surface of the substrate 4, so as to define a basic component of the camera module. This basic component is joined to the flexible multilayer substrate 9 including the feeding coil 5, with solder bumps interposed therebetween, so that the camera module 15 illustrated in FIG. 11B is able to be provided. Then, while the camera module 15 including the feeding coil 5 is being positioned with respect to the metal housing 50 with the lens holder 2 inserted in the opening 51 in the metal housing 50, the flexible multilayer substrate 9 is bonded to the inner surface of the metal housing 50 with the bonding member 30 interposed therebetween.

Sixth Preferred Embodiment

Figure 12:
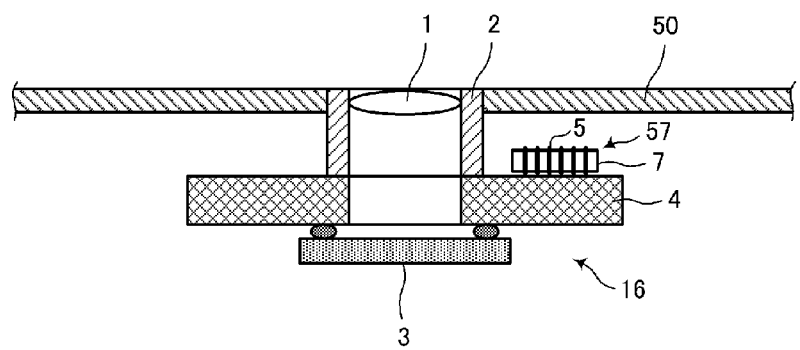
FIG. 12 is a cross-sectional view illustrating a structure of a camera module according to a sixth preferred embodiment of the present invention, together with a portion of the metal housing.

FIG. 12 is a cross-sectional view illustrating a structure of a camera module according to a sixth preferred embodiment of the present invention, together with a portion of the metal housing. A camera module 16 includes the lens 1, the lens holder 2, the image sensor 3, and the substrate 4. A feeding-coil chip component 57 is mounted on the substrate 4.

The feeding-coil chip component 57 is a coil component defined by winding the feeding coil 5 around the magnetic member 7, such as a ferrite core. Thus, the feeding coil 5 defining a surface mount device (chip component) may be used. The feeding-coil chip component 57 is mounted on the surface (upper surface) of the substrate 4 adjacent to the metal housing 50. In the space between the image sensor 3 and the lens 1, the feeding-coil chip component 57 is disposed at a level between the lens 1 and the lower end portion of the lens holder 2 (i.e., the end portion in contact with the substrate 4) in the direction of the optical axis of the lens 1 (i.e., the direction of height).

Seventh Preferred Embodiment

Figure 13:
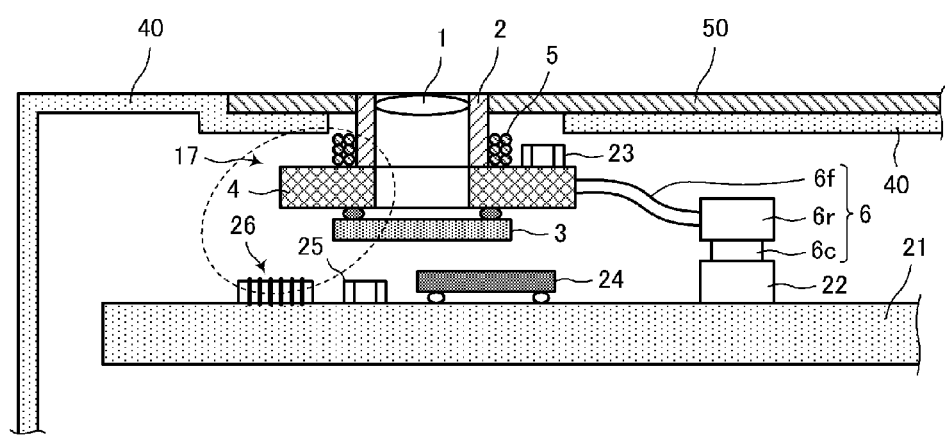
FIG. 13 is a cross-sectional view illustrating a structure of a camera module and an electronic apparatus according to a seventh preferred embodiment of the present invention.

FIG. 13 is a cross-sectional view illustrating a structure of a camera module and an electronic apparatus according to a seventh preferred embodiment of the present invention. A camera module 17 includes the lens 1, the lens holder 2, the image sensor 3, and the substrate 4. The lens holder 2 is provided with the feeding coil 5 therearound. The chip capacitor 23 is mounted on the substrate 4.

The plug 22, the chip capacitor 25, the RFIC 24, and a coupling coil 26 are mounted on the circuit board 21 in the electronic apparatus.

In the structure illustrated in FIG. 3 in the first preferred embodiment, a current is directly fed to the feeding coil 5. In the present preferred embodiment, however, a current is not directly fed, and the coupling coil 26 coupled to the feeding coil 5 by a magnetic field is provided. Also, the chip capacitor 23 is mounted on the substrate 4 of the camera module 17. A broken line in FIG. 13 is a line of magnetic force representing the magnetic field coupling between the coupling coil 26 and the feeding coil 5.

Figure 14:
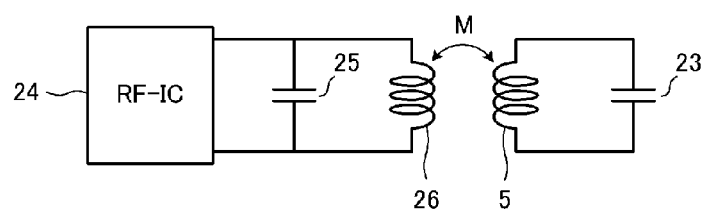
FIG. 14 is a circuit diagram of an antenna device including the feeding coil 5 and a coupling coil 26.

FIG. 14 is a circuit diagram of an antenna device including the feeding coil 5 and the coupling coil 26. The capacitor 23 is connected in parallel to the feeding coil 5 to define a resonance circuit. The capacitor 25 is connected in parallel to the coupling coil 26 to define a resonance circuit. This parallel circuit is connected to the RFIC 24. That is, the feeding coil 5 is indirectly connected to the RFIC 24 by the magnetic field coupling with the coupling coil 26. The inductance of the feeding coil 5, the inductance of the coupling coil 26, the capacitance of the capacitor 23, and the capacitance of the capacitor 25 are determined such that the two resonance circuits described above resonate in the communication frequency band.

With this structure, the cable 6 that connects the camera module 17 to the circuit board 21 does not need to include the signal lines for wireless communication. That is, the signal lines that connect the feeding coil 5 to the RFIC 24 do not need to be included in the cable 6.

Eighth Preferred Embodiment

Figure 15:
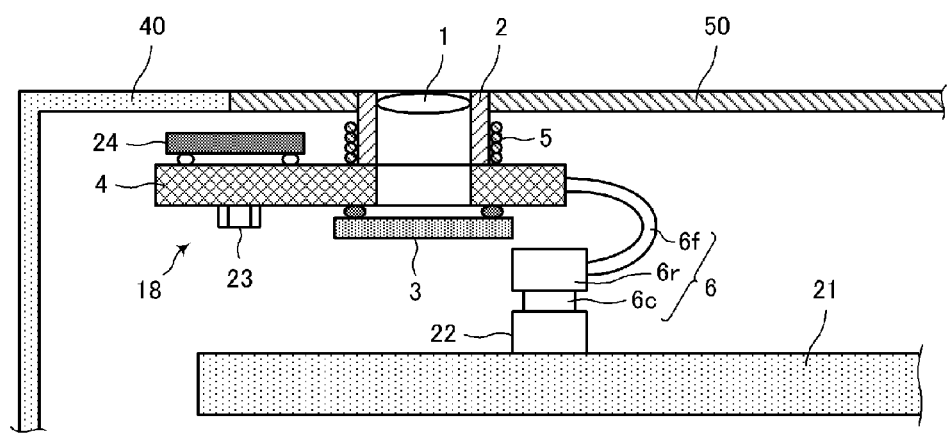
FIG. 15 is a cross-sectional view illustrating a structure of a camera module and an electronic apparatus according to an eighth preferred embodiment of the present invention.

FIG. 15 is a cross-sectional view illustrating a structure of a camera module and an electronic apparatus according to an eighth preferred embodiment of the present invention. A camera module 18 includes the lens 1, the lens holder 2, the image sensor 3, and the substrate 4. The lens holder 2 is provided with the feeding coil 5 therearound. The chip capacitor 23 and the RFIC 24 are mounted on the substrate 4. The chip capacitor 23 is mounted on the surface (lower surface) of the substrate 4 opposite the metal housing 50. In the space between the image sensor 3 and the lens 1, the chip capacitor 23 is disposed at the level of the image sensor 3 in the direction of the optical axis of the lens 1 (i.e., the direction of height). The RFIC 24 is mounted on the surface (upper surface) of the substrate 4 adjacent to the metal housing 50. In the space between the image sensor 3 and the lens 1, the RFIC 24 is disposed at a level between the lens 1 and the lower end portion of the lens holder 2 (i.e., the end portion in contact with the substrate 4) in the direction of the optical axis of the lens 1 (i.e., the direction of height). The chip capacitor 23 and the RFIC 24 may be disposed on the upper surface and the lower surface, respectively, of the substrate 4, or may both be disposed on the same surface of the substrate 4.

As described above, the camera module may include not only the feeding coil 5 but also the communication circuits.

Ninth Preferred Embodiment

Figure 16:
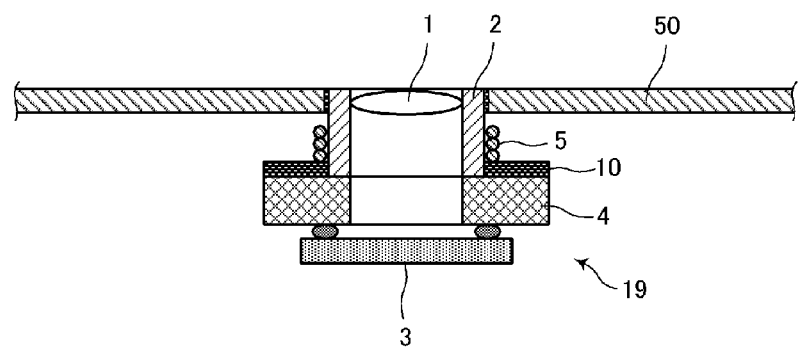
FIG. 16 is a cross-sectional view illustrating a structure of a camera module and an electronic apparatus according to a ninth preferred embodiment of the present invention.

FIG. 16 is a cross-sectional view illustrating a structure of an electronic apparatus including a camera module 19 according to a ninth preferred embodiment of the present invention. The camera module 19 includes a magnetic sheet 10, unlike the camera module 11 illustrated in FIG. 2B in the first preferred embodiment. The other structure is the same as that described in the first preferred embodiment.

The magnetic sheet 10 is produced preferably by forming a resin material mixed with a ferrite filler into a sheet, and has a hole for insertion of the lens holder 2. The magnetic sheet 10 may be a sintered ferrite plate.

The planar shape of the magnetic sheet 10 is identical or substantially identical to the planar shape of the substrate 4, and the magnetic sheet 10 is disposed on the upper surface of the substrate 4. The magnetic sheet 10 is disposed between the feeding coil 5 and the substrate 4.

With the magnetic sheet 10 disposed between the feeding coil 5 and the substrate 4, undesired coupling between a circuit provided in the substrate 4 and the feeding coil 5 is significantly reduced or prevented. Accordingly, for example, noise associated with a digital signal generated by the circuit in the substrate 4 is able to be prevented from being superimposed on the feeding coil, and hence wireless communication performed via a faint magnetic field using the feeding coil 5 is not negatively affected.

As viewed from the substrate 4, the magnetic sheet 10 defines and functions as a shield against a magnetic field generated by the feeding coil 5. Accordingly, the magnetic field generated by the feeding coil 5 is prevented from causing an eddy current to flow through a conductor of the substrate 4.

Since the magnetic sheet 10 is provided, together with the feeding coil 5, as an integral portion of the camera module 19, variation in the position of the magnetic sheet 10 relative to the substrate 4 and the feeding coil 5 is significantly reduced.

The magnetic sheet 10 of the present preferred embodiment does not necessarily need to be identical to the planar shape of the substrate 4. The magnetic sheet 10 may be of any size and shape, as long as it is possible to achieve advantageous effects of the suppression of undesired coupling and the magnetic field shielding described above.

Other Preferred Embodiments

Although the metal housing is preferably provided in the preferred embodiments described above, the housing does not necessarily need to be made of metal. The housing can be used as a radiating element for communication, as long as it is a conductive housing. For example, the housing may be made of conductive carbon fiber. The housing is not limited to that made only of metal, and may be made of a plurality of materials. For example, the housing may be made of resin and metal foil.

Although the casing of the camera module is not described in the preferred embodiments described above, the camera module may be provided with a case that surrounds at least the substrate 4 and the image sensor 3.

Although the housing preferably includes the opening and the slit in the preferred embodiments described above, the housing may have no slit. In this case, the opening preferably extends to reach the outer edge of the housing. That is, the opening preferably has a notch shape.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A camera module comprising:
   a lens; and
   an image sensor that converts an image formed by the lens into an electrical signal; wherein
   the camera module is disposed such that the lens is exposed from an opening in a conductive housing of an electronic apparatus;
   the conductive housing itself functions as a radiating element for wireless communication;
   the camera module includes a feeding coil to which a feeding circuit is directly or indirectly connected;
   the camera module further includes a lens holder that holds the lens;
   a magnetic member is disposed along an outer periphery of the lens holder; and
   the feeding coil is wound along an outer periphery of the magnetic member so as to be wound around the lens holder about an optical axis of the lens.

2. The camera module according to claim 1, wherein the feeding coil is disposed in a space between the image sensor and the lens in a direction of the optical axis of the lens.

3. The camera module according to claim 1, further comprising a substrate, wherein the feeding coil and the magnetic member are disposed in a space between the conductive housing and the substrate.

4. The camera module according to claim 3, wherein the substrate is disposed between the feeding coil and the image sensor.

5. The camera module according to claim 1, further comprising a cable including a plurality of signal lines, the cable being connected at a first end thereof to a circuit on a side of the image sensor and connected at a second end thereof to a circuit on a side of the electronic apparatus, the second end being opposite the first end; wherein
   the feeding coil is connected to at least one of the plurality of signal lines of the cable.

6. The camera module according to claim 1, wherein the conductive housing is made of a material that includes a conductive material.

7. The camera module according to claim 1, wherein the conductive housing is made of a material that includes a metal.

8. The camera module according to claim 1, wherein the magnetic member is made of a material that includes a ferrite material.

9. An electronic apparatus comprising:
   a conductive housing including an opening, the conductive housing itself functioning as a radiating element for wireless communication; and
   a camera module including a lens and an image sensor that converts an image formed by the lens into an electrical signal; wherein
   the camera module is disposed such that the lens is exposed from the opening of the conductive housing of the electronic apparatus;

the camera module includes a feeding coil to which a feeding circuit is directly or indirectly connected;
the camera module further includes a lens holder that holds the lens;
a magnetic member is disposed along an outer periphery of the lens holder; and
the feeding coil is wound along an outer periphery of the magnetic member so as to be wound around the lens holder about an optical axis of the lens.

* * * * *